United States Patent

Haywood et al.

[11] 4,082,947
[45] Apr. 4, 1978

[54] SOLAR COLLECTOR AND DRIVE CIRCUITRY CONTROL MEANS

[75] Inventors: George Lewis Haywood, South Rockwood, Mich.; Wesley Joseph Haywood, Harvard, Mass.

[73] Assignee: The George L. Haywood Co., Flat Rock, Mich.

[21] Appl. No.: 670,402

[22] Filed: Mar. 25, 1976

[51] Int. Cl.² ............................ G01J 1/20; H01J 39/12
[52] U.S. Cl. ............................ 250/203 R; 250/208; 126/270
[58] Field of Search ............... 250/203 R, 201, 208; 356/152, 141; 126/270, 271; 244/1 SA, 3.16; 353/3

[56] References Cited

U.S. PATENT DOCUMENTS

| | | | |
|---|---|---|---|
| 3,229,102 | 1/1966 | Spencer et al. | 250/203 |
| 3,448,273 | 6/1969 | Webb | 250/203 |
| 3,515,594 | 6/1970 | Samuels | 250/203 |
| 3,780,966 | 12/1973 | Newcomb, Jr. et al. | 250/203 |
| 3,800,146 | 3/1974 | Brunkhorst et al. | 250/203 |
| 3,917,942 | 11/1975 | McCay | 250/203 |
| 3,970,269 | 7/1976 | Conforti | 250/203 |

*Primary Examiner*—Alfred E. Smith
*Assistant Examiner*—David K. Moore

[57] ABSTRACT

A control that will, when attached to a Solar Collector in a proper manner, allow said Solar Collector to track the sun as to azimuth and elevation automatically, without manual assistance, through the diurnal cycle without regard as to whether the sun is visible or not. Also controlling said Collector at sunset to return to an Easterly setting to await the following diurnal cycle.

7 Claims, 12 Drawing Figures

NOTE INCREASE IN INITIAL SLOPE DUE TO SHADOW PLATE

SOLAR COLLECTOR AND DRIVE CIRCUITRY CONTROL MEANS

BRIEF SUMMARY

The invention consists of the following:

A sensor assembly consisting of two sensors with their edges joined at 90° angle placed under a small flat shadow casting plate and oriented toward the sun. The sensor assembly is mounted on the Solar Collector proper and rotates with it on an axis parallel to the earth's axis. The purpose of the sensor assembly is to detect between the two detectors an unbalance in the incident solar irradiation, and to provide an electrical output signal which is differentially summed and is used after amplification and conversion to digital format to drive a control motor coupled through a gear train to the Solar Collector proper.

The overall function of the Solar Collector Controller is to ascertain the local solar normal, generate an error signal if the normal deviates from the joint normal between the sensor surfaces, process this signal in an electronic data processor either analog or digital, but digital preferably, and use the resultant signal to drive a subminiature motor through a high ratio gear train so as to orient the Solar Collector proper normal to the incident solar flux.

In special cases of cloudy weather, at sunrise, and sunset, the above operation is modified somewhat as follows:

Sub. 1. At sunrise the Solar Collector carrying the Solar Collector Controller is oriented due East. Upon sunrise the above described operation of the controller will commence, and the controller will subsequently track the sun through its diurnal cycle to its Westerly extremity. The output of the Solar Sensors is summed additively and its level measured by a separate circuit to determine sunset. After sunset when the sensor signal falls below a threshold level, a second control circuit is initiated and the control motor drives the entire collector from the West back to its most Easterly position to await the subsequent sunrise.

Sub. 2. In the case of inclement weather where the sun is not directly visible but radiation is being emitted by either a hemispherical sky, or portions of the sky under the overcast, the sensor assembly will sense the mean normal incident radiation line and by providing an error signal through the electronics channel to the control motor and drive the solar collector so as to aim the collector in the direction of maximum incident flux. This incident flux may or may not coincide with the local solar normal; however, it will allow optimization of collection efficiency by maximizing incident flux.

Sub. 3. The solar collector controller functions in such a manner as to absolutely drive the collector in the effective direction in the following way:

If a large angle exists between the sun and the joint normal between the sensor surfaces, the sensor assembly geometry is such that one sensor will be more fully illuminated under any circumstances, and the differential output between the sensors will therefore cause the electronics and drive motor assembly to drive the solar collector in the correct direction to reduce irradiation on the more irradiated detector and to cause a balanced input to the detectors to occur. This is the case for maximization of input of collector irradiation, and is the designed mode of operation. This is the fundamental basis for this Invention.

BRIEF DESCRIPTION OF DRAWINGS

In the following.

DETAILED DESCRIPTION

Description of Sensor Geometry

Figure 1A:
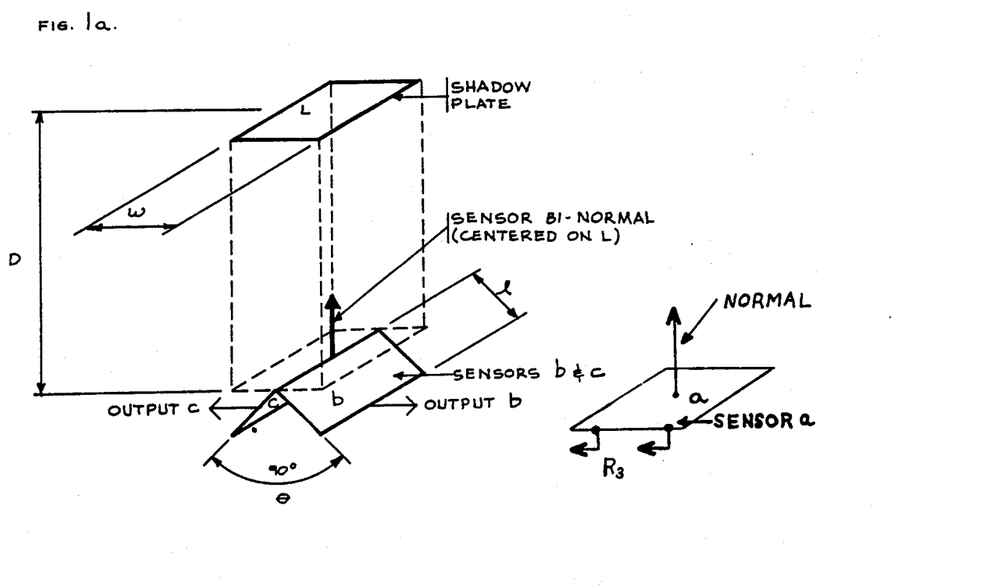
FIG. 1a is the optical geometry of the sensor and shadow plate assembly embodying the invention.

Refer to FIG. 1a, The Optical Geometry. Plate L, the shadow plate, is located between the solar normal and a pair of infrared or radiation sensors, oriented 90° with respect to each other. The common normal of the sensor pair is oriented perpendicular to the shadow plate, and parallel to the local solar normal. Each sensor has length $l$ and area equal to $l$ squared. The shadow plate has width W and is separated by distance D from the sensor pair.

The defining equation for the sensor optical assembly as shown in FIG. 1a is $l \cos \theta/2 = W/2$. $\theta$, the angle between the sensors, is typically 90° and is equal to the width of the shadow plate divided by 2. These parameters define W, l, and the angle subtended between the sensors. Because of the action of the shadow plate, and by appropriate selection of the length of sensors $b$ and $c$ as shown in FIG. 1a, each sensor is partially obscured and receives less than its full ration of solar irradiance.

Figure 1B:
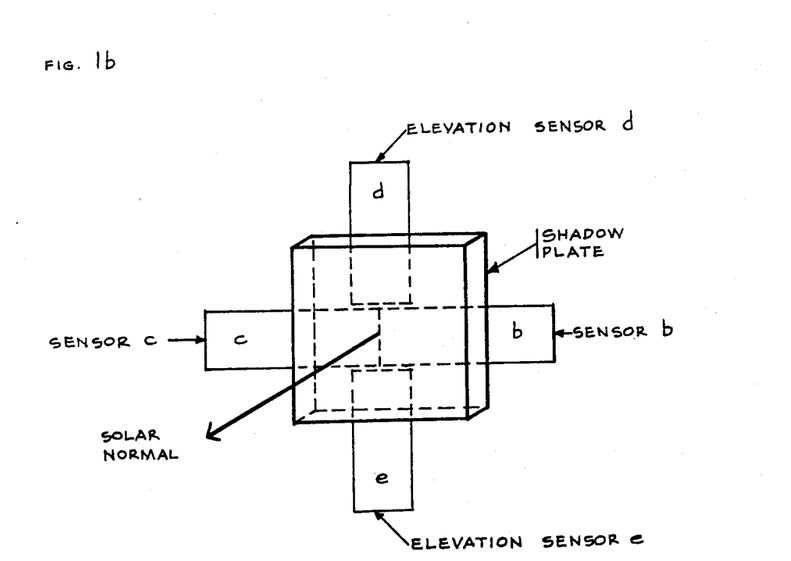
FIG. 1b is the two-axis sensor top view.

If in fact the common bi-normal is parallel to the solar normal, the sensors are equally shielded and their outputs are equal and opposite in polarity by selection. Under these circumstances, diurnal motion of the sun will cause the shadow of the shadow plate to shift from one sensor to another, at a rate determined by the distance D and geometry W of the shadow plate and width 1 of the sensors respectively. In common with sensors $b$ and $c$ are sensors $d$ and $e$ as shown in FIG. 1b which perform the same function in the elevation axis as sensors $b$ and $c$ perform in the azimuthal axis.

Figures 2, 3:
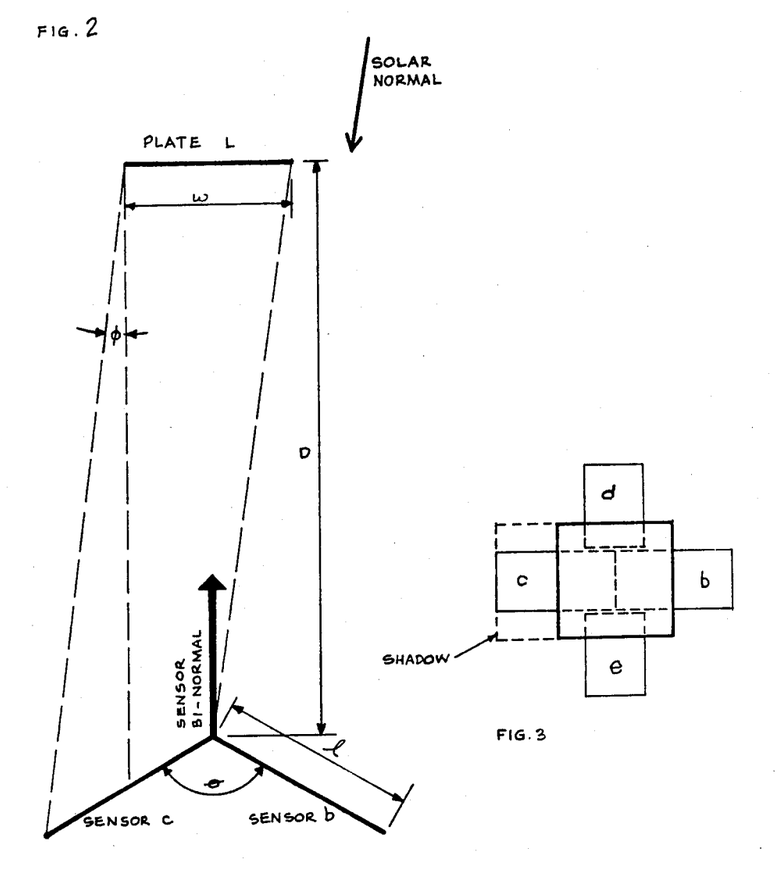
FIG. 2 shows the geometry angular sensitivity.
FIG. 3 is the sensor assembly plan view.

The effect of this geometry is shown in FIG. 2 where the solar normal and the sensor bi-normal are no longer parallel. The projected shadow of the shadow plate L now falls more fully on one sensor than the other, and now the defining equation becomes $\tan \phi = (l \times \cos \theta/2)/D$.

As shown in table 1, for typical values of D of 1 inch, 3 inches, and 10 inches, and selected parameters of 1 equals to 1.4 inches and W equal to 1 inch, the calculated values of $\phi$ are 26.37° for a 1-inch separation D; 9.37° for a 3-inch separation D; and 2.83° for a 10-inch separation D. It can be seen that by appropriate selection of 1, W, and D, the angular sensitivity of the combination to displacement of the solar normal can be selected. To discuss the effect of shadow plate and sensor geometry on the system error sensitivity, refer to FIG. 4.

ERROR RESPONSE CURVES

Figure 4:
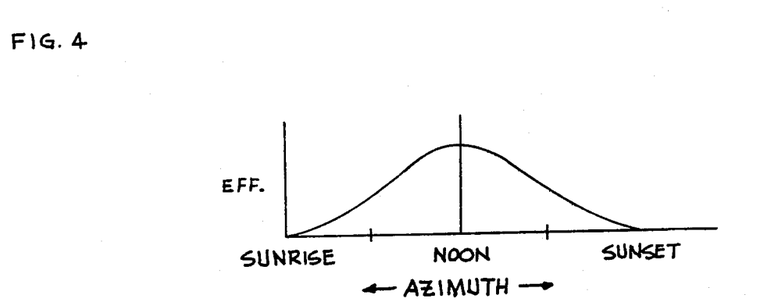
FIG. 4 is the response of a fixed array versus solar angle.
Figure 5:
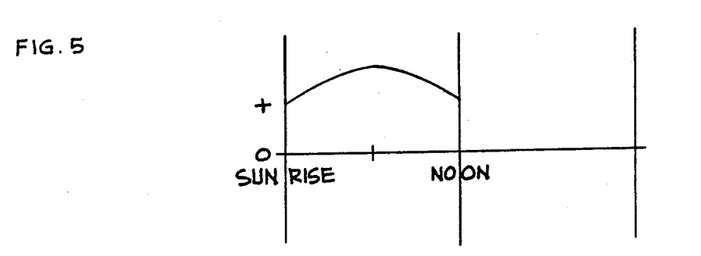
FIG. 5 is the response curve of sensor $b$ output versus forenoon solar angle.

FIG. 4 indicates the relative output or efficiency of a fixed array, erected perpendicular to mean noon sunlight at the latitude of the array, and shows that efficiency varies from zero at sunrise to a maximum at mean high noon and back to zero at sunset. FIG. 5 shows the output of sensor B under the same conditions as FIG. 4. At sunrise the output of the sensor has a large positive value, less than maximum, but not zero. It rises to a maximum as solar normal becomes perpendicular to sensor B and then begins to decrease.

Figure 5B:
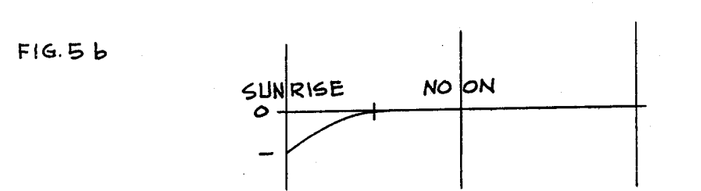
FIG. 5b is sensor $c$ response versus forenoon solar angle.

FIG. 5b shows the output of sensor c. It is negative in value, equal to b at sunrise, increases to zero and remains at zero for a large part of the day because of shielding by sensor b.

Figure 5C:
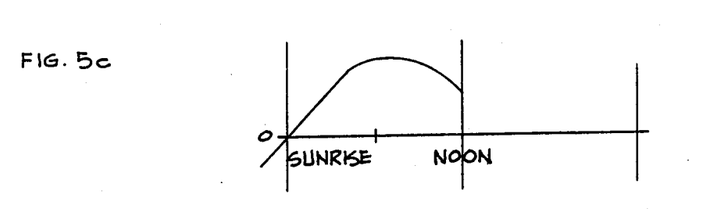
FIG. 5c is the differential sum of 5b and 5 above.

FIG. 5c shows the differential summation of the output of sensors b and c. It can be seen that the differential sum is zero at sunrise, and rises to the peak value at 45° solar elevation.

Figure 5D:
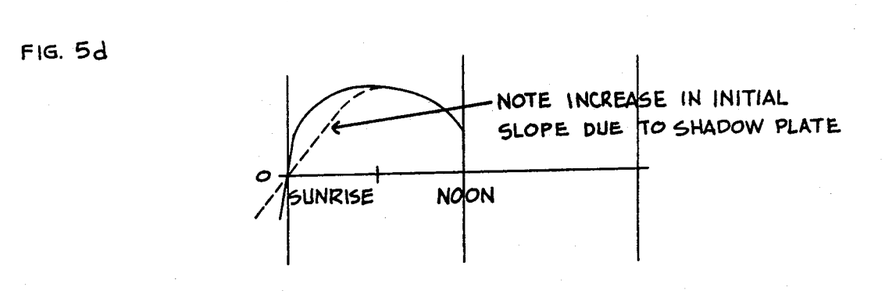
FIG. 5d is the differential sum of 5b and 5 above with the shadow plate in place.

The addition of the shadow plate has the effect of increasing the slope of the differentially summed output of the sensors as shown in FIG. 5d, and increases the error slope in the vicinity of zero voltage. Appropriate selection of shadow plate size, element spacing D, and sensor size 1 allows engineering selection of the required slope to match nominal design requirements.

Figure 6:
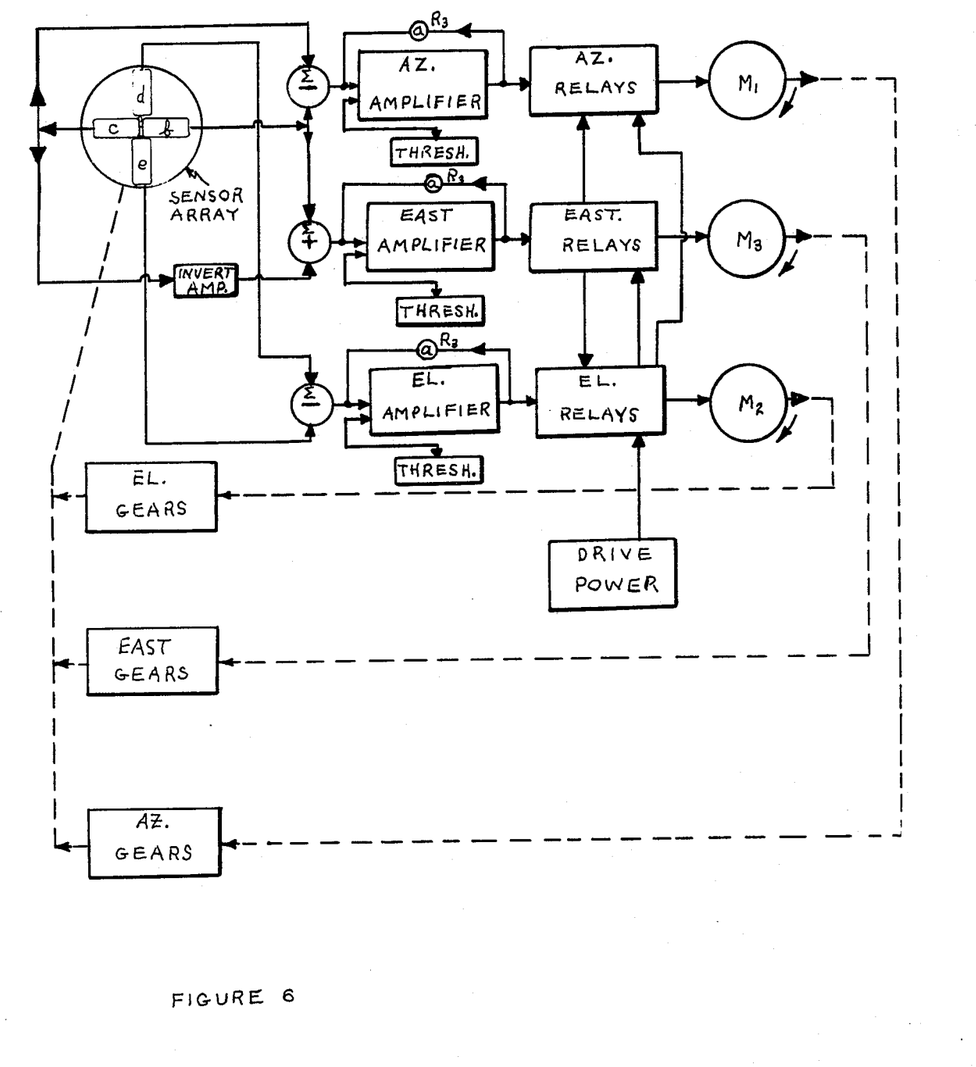
FIG. 6 is the block diagram of the azimuth, elevation and Easting systems, shown in the full West position (sunset).

Reference to FIGS. 4, 5, and 6 implies the ability of the system designer to select motor, gear train, and system sensitivity parameters in a meaningful way for an engineering design compatible with specific system requirements. It can be shown that deviation of the solar normal from perpendicularity to the shadow plate may be as large as plus or minus 5° before the collector efficiency will depart by more than one percent from the nominal maximum. Under these conditions selection of the motor and gear train are such that gear train ratios of a high value may be used, resulting in very small motors and requiring only periodic correction several times per hour, in order to cause adequately accurate tracking of solar irradiance to maximize collector efficiency.

ELECTRONIC DATA PROCESSING

Figure 7:
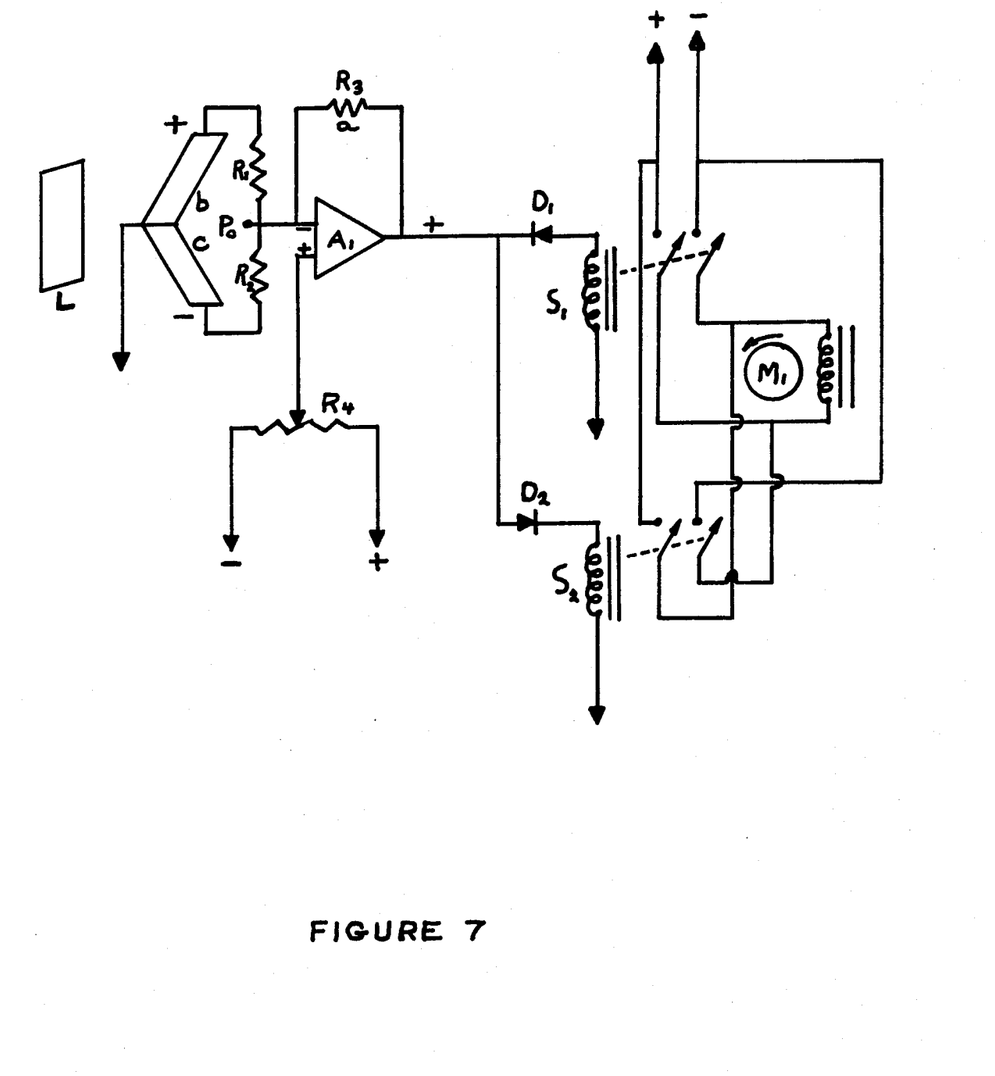
FIG. 7 is the control circuit for the azimuth axis. It is duplicated for sensors $d$ and $e$ for the elevation axis.

The electronic and data processing functions are shown in FIG. 7, which is a schematic diagram of one pair of sensors, typically the azimuth control sensors b and c, together with the shadow plate located at the left, marked "L."

AZIMUTH CONTROL CIRCUIT OPERATION

The output of the sensors is summed differentially in resistors R1 and R2, and appears as a voltage at point "P," and is applied to the negative input terminal of amplifier A1. The positive input terminal of amplifier A1 has applied to it through R4 a threshold control voltage The output of amplifier A1 is fed back to the minus input of A1 through the feedback resistor R3. The purpose of resistor R3 is to set the amplifier gain. The amplifier gain determines the change in solar angle which will actuate the azimuth drive motor. It is desirable that the change in solar angle be constant as solar flux intensity changes.

The angle sensitivity of the Solar Collector Controller increases as the signal from sensors b and c increases. The amplifier gain must decrease to compensate. R3 must decrease as flux increases to maintain constant angular sensitivity.

R3 is a sensor with resistance inversely proportional to solar flux. It is positioned parallel to the collector surface to receive peak radiance and varies amplifier gain. R3 is a sensor a, the gain control sensor, in FIG. 1a.

The amplifier output is applied jointly to diodes D1 lc D2 shown in FIG. 7.

Because of the threshold setting of resistor R4 and the value of potential at point "P," the output of amplifier A1 will either be positive, zero, or negative.

If the output of the amplifier is zero, no current will flow in diodes D1 or D2; associated relays S1 and S2 will both remain open.

In this event the azimuth drive power supply is not connected to motor M1, the azimuth drive motor, and no rotation will result.

This motor is coupled to the Solar Collector which carries sensors B and C and shadow plate "L" as part of the mechanical structure. No net motion in the system will result. This condition obtains when one of two conditions exist:

A. Either both detectors are equally illuminated by sunlight, or

B. Neither detector is illuminated by sunlight.

The first condition will occur only if the joint normal passing through the center of the shadow plate is co-linear with the local Solar Normal. This is the desired condition for maximization of Insolation Radiation Flux on the Solar Collector.

Due to diurnal motion, the sun will move through a small angle and one sensor, namely b, will by design receive more flux that its neighbor c. In this condition the differential potential at point $P_o$ will be positive; amplifier A1 will have a negative output, diode D1 will conduct and relay S1 will be closed; closure of relay S1 actuates motor M1.

The motor runs in a clockwise direction by arrangement so as to move the collector array toward the Solar Normal, moving the shadow of Plate L further on to sensor b and further off of sensor c. This restores the previously balanced condition, reducing the potential at point $P_o$ to zero, (or below the threshold potential set by resistor R4) causing the current to diode D1 to cease, motor M1 to stop, and the array will come to rest.

This action will take place intermittently and continuously during the day in such a fashion as to cause the mechanical combination of the sensor array and the Solar Collector to follow the Solar Normal across the diurnal path.

In the event that an error angle occurs between Solar Normal and the sensor bi-normal due to the presence of cloud cover or other interfering effects such that sensor c receives more illumination, the operation above is reversed as follows:

The output of sensor c is now a large negative voltage; when summed with sensor b potential, the point $P_o$ will be negative. Amplifier A1 will invert the signal causing a positive potential at its output.

If this potential exceeds the threshold set by R4, diode D2 will conduct, diode D1 will remain in a non-conducting condition, relay S2 will close, the azimuth drive potential is now applied to motor M1, and the motor will run in a counterclockwise direction, resulting in a rotation of the solar array in a counterclockwise way so as to restore the balance of solar radiation to sensors *b* and *c* as balance described above.

A sketch of the error output of the system at the output of amplifier A1 is shown in FIG. 7.

It should be noted that the small box A at the center of the control slope curve represents the adjustable deadspace controlled and adjusted by resistor R4. The potential at amplifier A1 output must exceed this threshold before either relay will close resulting in an adjustable deadspace in accordance with the previously claimed mode of operation.

This constitutes the complete mode of operation of the azimuth drive circuitry for the Solar Collector Controller.

ELEVATION CONTROL CIRCUIT OPERATION

Control of the elevation angle of the solar collector is produced by a circuit precisely similar to FIG. 7 with two changes. A second pair of sensors, *d* and *e*, are arranged in a similar geometric form as sensors *b* and *c*, but at right angles to *b* and *c*. They too are shielded by plate L in such a way as to receive equal radiance from the sun only when the elevation axis is perpendicular to the solar normal.

Inserted at point X is a pendulous device mechanically coupled to a switch which disconnects point P from amplifier A1, except over the five degree interval centered around mean high noon local time. During this interval of 5° of solar travel, point $P_o$ is connectd to A1 and operation of relays S1 and S2 are as previously described, except that motor M2 is driven by the azimuth drive power supply. Motor M2 is connected to the elevation axis rather than the azimuth drive axis. An exactly identical operational cycle results restricted by the fact that corrections are applied only when the solar collector array is vertically aligned with local gravitational vertical.

At other periods of the day from sunrise through sunset, this circuit is disabled to prevent erratic operation due to solar conditions at sunrise and sunset. Since the annual correction rate is extremely low in the elevation axis, much coarser correction can be used, lower gear ratios and less frequent correction will be required. The operation in both axes is otherwise identical and identical sensors are used for azimuth and elevation sensing circuits.

EASTING CONTROL CIRCUIT OPERATION

The third mode of operation is the Easting circuit. With reference to mode number one, the azimuth control circuitry, refer to FIG. 8, the Easting circuit. The sensors *b* and *c* are similarly geometrically arranged as before. The output of sensor *b* is applied to R11 and summed at point $P_o$ into Threshold Cicuit 0. The output of sensor *c* is passed through an inverting amplifier A2 which multiplies the output potential by minus one, thereby inverting it. It is then applied to R12 and summed additively with the output of sensor *b*. In this case the presence of radiation on either sensor will result in a positive potential at point $P_o$. The absence of radiation will result in zero potential at point $P_o$. This operation is as opposed to the previously described operation of the sensors in the azimuth control circuitry, where polarity reverses, if radiation imbalances occur.

Figure 8:
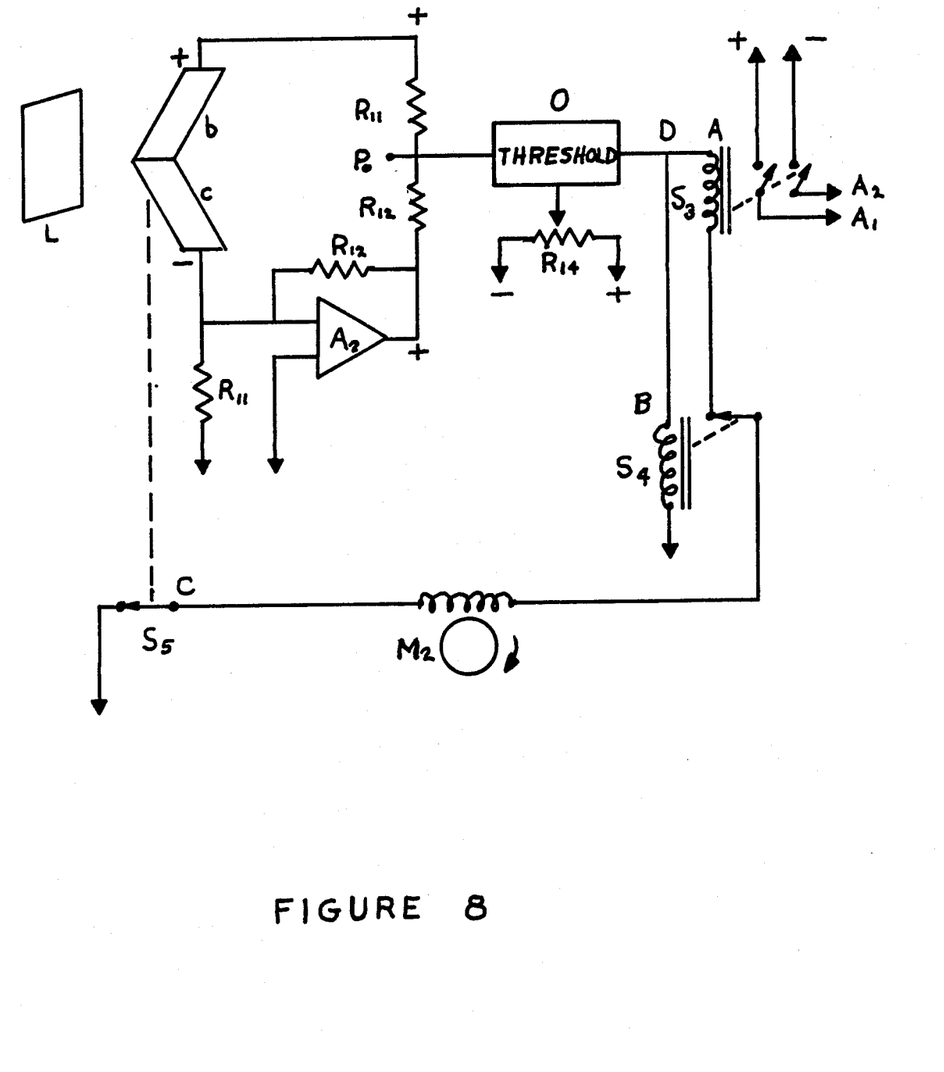
FIG. 8 is the Easting circuit diagram and operation table.

The resultant positive potential due to solar irradiance is passed through a threshold circuit controlled by resistor R14 in such a way that if the positive voltage to the input to the threshold circuit at point $P_o$ exceeds the threshold set by R14, relay S3 closes, the azimuth drive control power supply connection is completed and the previously described azimuth drive control circuit functions described in FIG. 7 will obtain.

Simultaneously relay S4 closes and motor M3, the east drive motor, is disconnected from the azimuth drive power supply. The drive motor function is to cause the entire array to precess from west to east under conditions as described below.

Simultaneously, switch S5 which was open under sunrise conditions, will close, due to mechanical motion of the array away from the easterly setting. These conditions will obtain during the process of azimuth tracking during the diurnal cycle until the sun approaches the western horizon.

At this point the total solar radiance on sensors b and c will drop to reduce the positive potential at point P toward zero. When this potential decreases below the threshold level set by threshold adjustment R14, relays S3 and S4 will close, since switch S5 is closed, the result is that the azimuth drive power supply potential is applied to the Easterly drive motor M3 which proceeds to precess the entire array through 180° back to its sunrise sensing position. At this point due to a mechanical coupling between motor M3 and switch S5 which is a limit switch, S5 will be opened mechanically, and the entire solar collector array comes to rest at its Easterly position.

During this entire operation the azimuth drive motor has been disabled by the opening of the contacts on S3. The Easterly drive motor has been enabled by the closing of S4, the function of S5 is to mechanically stop the array at its easterly position. Upon sunrise the following day the operation described above is reversed. The operational steps for this circuit are as follows. Four conditions of operation obtain.

1. Sunlit

Assume the sensors are sunlit at or beyond sunrise. Contact A on switch S3 is closed, power is supplied to the azimuth drive circuitry. Contact B on relay switch S4 is open, power is removed from the Easterly drive motor, and contact C which is limit switch S5, is closed. Under these conditions, orderly azimuth drive and solar tracking functions will take place.

2. Night (West)

At nightfall, the solar irradiance level on sensors *b* and *c* decreases below the threshold level set by resistor R14, under these conditions contact A will be open, removing the power from the azimuth drive control circuitry. Contact B of relay switch S4 is closed, restoring the power to M3 the Easterly drive motor. Contact C is closed causing the Easterly drive motor to rotate, precessing the entire solar array back to the Easterly rest position.

3. Nighttime East

This condition obtains when the array mechanically reaches its Easterly rest position, at this point contact A is open, the azimuth control circuit is disabled. Contact B is closed, the Easterly drive motor is enabled, but contact C is open, the mechanical limit switch stops the rotation of the Easterly drive motor and the entire array comes to rest in its Easterly rest position.

4. Sunrise

At sunrise the sensor elements b and c produce a positive potential which is applied to the threshold circuit, when this potential exceeds the threshold set by R14, S3 and S4 will close Contact A, enabling the azimuth drive circuit by applying azimuth drive power to it. Contact B is simultaneously opened, disabling motor M3 the Easterly drive motor. Under this set of conditions orderly operation of the azimuth drive control circuitry will obtain and orderly diurnal tracking of the local solar normal will take place.

The above operational modes completely describe the methods of operation and the electronic functions necessary to the patent disclosure herein contained.

The mode of operation of amplifier A1 and A2, the mode of operation of threshold circuit 0, the type and size of motors M1, M2, M3 and the physical gear train conditions required by the solar collector are outside the scope of this patent, but are the subject of engineering calculations for application purposes only.

The embodiment of the invention illustrated and described above may be changed in form and distribution of the parts as to configuration and relative arrangement without departing from the scope of the invention.

Reference is given in the appended claims to the scope and limits of the invention.

What is claimed is:

1. A Solar Collector Controller comprising a solar sensor array, an electronic data processor and amplifier, a drive motor, a gear train, and means for mounting the controller on a gimbaled solar collector, said sensor array being a set of four sensors oriented in pairs at a 90° angle, each pair being oriented perpendicular to its neighbor so as to form a sensitive surface consisting of four sensor surfaces arranged to produce electrical signals, each pair of signals being summed differentially to produce an error signal having phase and amplitude proportional to the orientation of the sensor pair with respect to the incident solar flux, said sensor pairs being oriented parallel to and orthogonal to the diurnal path of the sun, said orientation providing an electrical signal proportional to azimuth and elevation of the solar normal in its cycle, said sensor array being placed below a shadow plate, said plate having an area smaller than the area of the sensor array so that a portion of the array is thereby shaded, said shading being equal when the sensor joint normal is parallel to the solar normal, said array then producing a null output, otherwise the relative solar angle produces an error signal proportional to the angle, an amplifier with a variable gain receiving said error signal, a fifth solar cell for controlling said variable gain connected in a feedback path across the amplifier, said amplifier output being applied to drive a motor and gear train mounted so as to position the solar collector carrying the radiation sensor array, the amplifier means arranged so as to drive the solar collector to reduce the relative solar angle to a null position for maximizing solar collector efficiency, control circuit means connected to said amplifier means for restoring the solar collector orientation to an easterly position when the solar irradiance on the sensor array falls below a pre-set threshold after sunset.

2. The Solar Collector Controller of claim 1 wherein the shadow plate is smaller than the projected sensor area, said plate being located above the sensors a few centimeters so as to continuously shield the sensors partially during the tracking cycle.

3. The Solar Collector Controller of claim 2 wherein the fifth solar sensor connected as a feedback resistor is a photo-resistor of the cadmium sulfide class, said photo-resistor being located atop the said shadow plate.

4. The Solar Collector Controller of claim 3 wherein the radiation sensors are silicon solar cells.

5. An improved Solar Collector Controller having a solar angle sensor means, a support for the collector which is moveable, an error sensing circuit, and a servo-mechanism positioning the collector for a minimum solar angle, wherein the improvement comprises a shadow plate mounted above said angle sensor means so that the sensors are partially shaded during the tracking cycle, thereby increasing the sensitivity of tracking, said servomechanism including an amplifier with a feedback loop, a fifth sensor connected in the feedback path of the servomechanism amplifier so as to control the servo loop gain independent of solar intensity when exposed to sunlight, a threshold measuring circuit being connected to said amplifier for repositioning the collector at nightfall to the easterly position.

6. The improved Solar Collector Controller of claim 5 wherein the sensor is comprised of a pair of silicon solar cells.

7. A Solar Collector Controller comprising a radiation sensor array co-mounted with a collector, said array having four sensors arranged in co-operative pairs, each pair having an angle greater than 180° between co-operative surfaces, one pair being oriented 90° from the adjoining pair to form a sensor array, said array being arranged with a shadow plate mounted perpendicular to the joint normal of the sensor surfaces, said plate being arranged above the sensor surfaces and sized to cast a shadow smaller than the sensor array to cause the sensors to be equally shadowed only when the sensor joint normal is parallel to the local solar normal, such equal shading providing a null output signal from each sensor pair by selection of polarity and connection to a common summing point for each pair, amplifier means connected to said sensors for detecting said null signal, said amplifier having a feedback path, a fifth sensor connected in said feed back path, said fifth sensor varying its resistance in accordance with solar intensity to affect the gain of the amplifier, said amplifier output being used to drive a control motor and gear train so as to orient the solar collector to restore the parallelism between the sensor joint normal and the local solar normal, said orientation thereby positioning the solar collector to maximize the heat input to the collector by presenting the maximum surface to the sun, circuit means connected to said amplifier for measuring total irradiance of the solar sensors, means response to said circuit means for returning the collector normal to an easterly direction after nightfall.

* * * * *